United States Patent
Rolow et al.

(10) Patent No.: US 6,355,289 B1
(45) Date of Patent: Mar. 12, 2002

(54) METHOD FOR PRESERVING TORTILLAS MADE FROM CORN OR WHEAT

(75) Inventors: Ann Marie Rolow, Grimes, IA (US); Francisco Arroyo, Mission, TX (US)

(73) Assignee: Kemin Industries, Inc., Des Moines, IA (US)

( * ) Notice: Subject to any disclaimer, the term of this patent is extended or adjusted under 35 U.S.C. 154(b) by 0 days.

(21) Appl. No.: 09/473,195

(22) Filed: Dec. 13, 1999

Related U.S. Application Data

(63) Continuation-in-part of application No. 08/935,776, filed on Sep. 23, 1997, now abandoned, which is a continuation-in-part of application No. 08/717,777, filed on Sep. 24, 1996, now abandoned.

(51) Int. Cl.$^7$ ............................................... A21D 15/00
(52) U.S. Cl. ........................ 426/321; 426/549; 426/622
(58) Field of Search ................................ 426/321, 335, 426/532, 549, 560, 615, 622, 439, 618

(56) References Cited

U.S. PATENT DOCUMENTS

| | | |
|---|---|---|
| 3,653,915 A | 4/1972 | Rubio |
| 3,694,224 A | 9/1972 | Rubio |
| 3,709,696 A | 1/1973 | Rubio |
| 3,853,997 A | 12/1974 | Rubio |
| 3,853,998 A | 12/1974 | Rubio |
| 3,859,449 A | 1/1975 | Rubio |
| 4,241,106 A | 12/1980 | Tims |
| 4,297,378 A | 10/1981 | Haasl et al. |
| 4,372,982 A | 2/1983 | Haasl et al. |
| 4,544,565 A | 10/1985 | Barnett |
| 4,613,512 A | 9/1986 | Barnett et al. |
| 4,627,987 A | 12/1986 | Barnett et al. |
| 4,642,240 A | 2/1987 | Barnett et al. |
| 4,735,811 A | 4/1988 | Skarra et al. |
| 4,871,570 A | 10/1989 | Barnett et al. |
| 5,057,330 A | 10/1991 | Lee et al. |
| 5,196,225 A | 3/1993 | Lush |
| 5,314,687 A | 5/1994 | Oakes et al. |
| 5,401,522 A | 3/1995 | Reeg |
| 5,437,868 A | 8/1995 | Oakes et al. |
| 5,462,714 A | 10/1995 | Talwalker et al. |

OTHER PUBLICATIONS

Brachfeld, Antimicrobial Food Additives, Bakers Digest, (Oct. 1969).

Barrett, Extending the Keeping Quality of Bakery Products, Bakers Digest, (Aug. 1970).

Pelaez & Karel, Development and Stability of Intermediate Moisture Tortillas, Journal of Food Processing and Preservation 4, 51–65 (1980).

Islam, et al., Mold Inhibition in Tortilla by Dimethyl Fumarate, Journal of Food Processing and Preservation 8, 41–45 (1984).

Tellez–Giron, et al., Microbiological Characteristics and Shelf Life of Corn Tortillas with and without Antimicrobial Agents, Journal of Food Protection, vol. 51, No. 12, 945–948 (Dec. 1988).

Haney, Shelf Life of Corn Tortilla Extended by Preservatives, Dairy, Food and Environmental Sanitation, vol. 9, No. 10, 552–553 (Oct. 1989).

Stauffer, Corn Masa, Baking & Snack, (Oct. 1993).

Bartek Fumaric Acid in Wheat & Corn Flour Tortillas—The Challenge of Keeping Them Fresh, Bartek Ingredients, Inc. (est. 1994).

Seiler, Factors Affecting the Use of Mould Inhibitors in Bread and Cake, Microbial Inhibitors Food, Proc. Int. Symp., 4th, 211–20, (1964).

Chipley, Sodium Bensozate and Benzoic Acid, in Antimicrobials in Foods, 2d ed. edited by P. Michael Davidson and Alfred Larry Branen, 11–48 (1993).

Food Preservatives, ed. by N.J. Russell and G.W. Gould, 18–19; 26–29;44–45;66–67 (1991).

Condensed Chemical Dictionary 774 (Gessner G. Hawley, ed., Van Nostrand Reinhold Co.) (1981).

Banwart, Basic Food Microbiology 602 (2d.ed., Van Nostrand Reinhold Co.) (1989).

*Primary Examiner*—Leslie Wong
(74) *Attorney, Agent, or Firm*—Kent A. Herink; Daniel A. Rosenberg

(57) ABSTRACT

A liquid preservative solution and method for extending the shelf life of tortillas and like products made from corn flour or wheat flour is proposed. The preservative solution contains propionic acid, phosphoric acid and a substance for inhibiting the growth of yeast or bacteria. In a preferred embodiment the yeast and bacteria inhibiting substance is benzoic acid. The preservative solution is antimicrobial in nature, and delays spoiling by retarding or preventing the growth of mold, bacteria, and yeast. The preservative solution has a fresh slightly sweet after-taste.

8 Claims, No Drawings

METHOD FOR PRESERVING TORTILLAS MADE FROM CORN OR WHEAT

RELATED APPLICATIONS

This is a continuation-in-part of Ser. No. 08/935,776 filed Sept. 23, 1997, now abandoned, which is a continuation-in-part of Ser. No. 08/717,777 filed Sept. 24, 1996, now abandoned.

BACKGROUND OF INVENTION

This invention relates generally to methods and chemicals for extending the shelf life of corn tortillas or wheat tortillas, and specifically to the preservation of corn tortillas or wheat tortillas by use of a mixture containing propionic acid, phosphoric acid, and benzoic acid.

Tortillas are flat breads produced by baking doughs prepared with corn flour or wheat flour. Dough prepared from corn flour is sometimes called "masa." Masa is typically prepared from a nixtamalized corn masa flour, cooked corn, corn flour, or a mixture of these. Tortillas are a food staple in Mexico and Central America and are growing in popularity in the United States. Tortillas are currently available to consumers through retail outlets such as supermarkets and grocery stores. The term "tortilla," to at least for the purposes of this application, includes such similar foods made from corn- or wheat-based dough, such as tamale shels, soft and hard taco shells, tortilla chips, tostados, burrito shells, pita bread, pocket bread, Jewish bread, corn bread, pizza crusts, and similar foods made from corn- or wheat-based dough. The term "tortilla flour" encompasses corn flour, wheat flour, corn masa flour, and cooked corn.

A problem with the retail production of tortillas is that the tortillas have a limited shelf life without the use of antimicrobial preservatives. Various antimicrobial preservatives have been proposed, however they have the limitations of increasing the cost of producing tortillas and/or adversely affecting the taste and odor. Naturally, extending tortilla shelf life without prohibitively increasing the tortilla production costs, or detrimentally affecting the taste or odor of the tortillas, results in better tortilla preservation.

The primary indications of spoilage for tortillas are an off odor or taste and the formation of mold. Another mechanism for spoilage is the staling of a tortilla with the passage of time. The present invention is not directed to staling, which typically occurs through the crystallizing of starch. The shelf life of a tortilla for the purposes of this application can be said to last from the time the tortilla is made until mode is visible, or a fermented or spoiled odor can be detected, whichever occurs first. The primary causes of spoilage are bacteria, mold, and yeast. In the laboratory, shelf life of varying formulations of tortillas can be compared by monitoring the output of carbon dioxide produced by the bacteria, mold, and yeast.

Preservatives and antimicrobial agents for use in tortillas shown in the prior art include: low molecular weight fatty acids such as acetic, propionic, and butyric acids (U.S. Pat. No. 3,859,499), or potassium sorbate (Pelaez and Karel, 4 "Development and Stability of Intermediate Moisture Tortillas," 4 *Journal of Food Processing and Preservation* 51–65 (1980)); sorbic acid (U.S. Pat. No. 3,853,997); esters of para-hydroxybenzoic acid or parabens (U.S. Pat. No. 3,853,997); glycerol, corn solids, and salt to lower the water activity (Pelaez and Karel, supra); and dimethyl fumarate (Islam et al, "Mold Inhibition in Tortilla by Dimethyl Fumarate," 8 *Journal of Food Processing and Preservation* 41–45 (1984)).

Tortilla producers and masa flour manufacturers commonly treat their tortilla flour with dry blends of sodium or calcium propionate for mold control, and potassium sorbate for bacteria and yeast control. Because these preservatives generally perform better with increasing acidity, acidulants, such as fumaric acid or citric acid, are used to reduce pH levels. A major drawback resulting from this type of preservative mixture is the lingering after-taste of the acidulant. These preservative mixtures have successfully increased the shelf life of tortillas in most cases. However, the taste of tortillas containing these preservatives has not been satisfactory. Also, the supply of some of these preservatives has been limited, making them difficult or expensive to obtain.

Due to the dissociation of acids at higher pH levels, weak acids do not perform well as preservatives at high pH levels. For this reason, it is often necessary to add acidulants to basic foods in order to utilize the antimicrobial action of weak acids. Phosphoric acid is well-known as an acidulant, and is routinely used to reduce the pH levels in foods so that weak lipophilic acids may be added as preservatives. However, the amount of phosphoric acid that must be used to reduce the pH level of tortillas to an acceptable level has been sufficient to impart a noticeable unpleasant taste characteristic to the tortillas.

Wheat flour tortillas have traditionally been preserved with a dry preservative mixture consisting of calcium propionate as a mold and rope inhibitor, an acidifier such as fumaric or citric acid, and usually potassium sorbate or sorbic acid for control of yeast and bacteria. This mixture has been effective in extending the shelf life of wheat flour tortillas; however, recently the cost of such mixtures has inflated due to shortages of potassium sorbate and sorbic acid. Furthermore, this mixture has unfavorable taste characteristics. For example, fumaric acid has a lingering after-taste as a result of its low solubility in water, which allows it to sit on the tastebuds and slowly dissolve. Citric acid gives a sharp burst of sourness at the initial taste, which is also undesirable. Mixing the dry ingredients of this prior art mixture is labor intensive and prone to variability because the powders must first dissolve and then disperse in the dough during mixing.

Propionic acid and calcium propionate are widely used to prevent the growth of mold in bakery products. Both are especially well-suited for use in leavened bakery goods as having minimal effect on yeast. Propionic acid and calcium propionate are preferred preservatives because they have little affect on the odor or taste of the finished product. As a salt of a weak acid, calcium propionate is most effective in the lower pH range, and typically is used with an acidulant. Weak organic acids that serve as preservatives have an ideal pH range, which is directly connected to the $pK_a$, or dissociation constant of the acid, when fifty percent (50%) of the total acid is undissociated or free to act as a preservative. Since the $pK_a$ of most organic acids lies between pH 3 and 5, acidifiers are typically used to decrease the pH of food in order to increase the undissociation, or "activate" the preservative. John R. Chipley, "Sodium Benzoate and Benzoic Acid," in *Antimicrobials in Foods* 12–13 (P. Michael Davidson & Alfred L. Branen eds., 2d ed. 1993). For example, the $pK_a$s of propionic acid and benzoic acid are 4.87 and 4.19, respectively. At these pH levels, fifty percent (50%) of the acid is undissociated. If the pH of a food is 5.4, only twenty percent (20%) of the propionic acid and a mere 7.75% of the benzoic acid would be undissociated and available as a preservative. The optimum anitmicrobial pH range for benzoic acid is 2.5 to 4. George J. Banwart, *Basic Food Microbiology* 602.

Some tortilla manufacturers add a liquid preservative to the tortilla during processing. Typical liquid formulations use propionic acid for mold control and phosphoric acid as an acidulant. Because these mixtures include a single preservative, rather than a combination of preservatives, high doses are required to achieve the desired shelf life. Despite the high levels of preservative, these liquid formulations are often not effective in controlling fermentation during high-stress seasons. A major negative taste resulting from this type of liquid formulation is that of phosphoric acid.

Benzoic acid is a well-known food preservative. It is generally used only in very acidic foods such as pickles, soft drinks and dressings. See N. J. Russell & G. W. Gould, Food Preservatives 19 (1991). Its use is typically limited to foods having a pH below 4.5. John R. Chipley, "Sodium Benzoate and Benzoic Acid," in Antimicrobials in Foods 11, 27 (P. Michael Davidson & Alfred L. Branen eds., 2d ed. 1993). Benzoic acid is also known to impart an off flavor. Id. Because of the narrow pH range in which it has generally been effective and because of its off-flavor, it is being replaced by other preservatives. (Chipley, supra, at 27). Benzoic acid has not been effective to control the growth of high-levels of microorganisms. Id. Because tortillas generally have a pH level above the optimum effective antimicrobial range of benzoic acid, benzoic acid has not been commonly used as a tortilla preservative.

Retail markets are emerging for uncooked tortilla dough and uncooked tortillas, allowing consumers to make fresh tortillas themselves. The dough is similarly susceptible to spoiling by the action of yeast, bacteria, and mold. The shelf life of dough or uncooked tortillas lasts from the time at which the dough is made until the time at which mold is visible, or the time at which a fermented or spoiled odor can be detected, whichever occurs first. A shelf life of less than twenty-four hours is expected for the unrefrigerated, unpreserved corn-based dough. A preservative which effectively retards or prevents the growth of various microorganisms including mold, bacteria and yeast, in order to extend the shelf life of tortillas and tortilla dough. without imparting a negative taste, or prohibitively increasing the cost is particularly desirable. Therefore, a continuing need exists to provide such preservation.

The present invention substantially eliminates the difficulties encountered in the prior art discussed above.

SUMMARY OF THE INVENTION

Accordingly, it is an object of the present invention to provide an improved preservative for extending the shelf life of tortillas made from corn flour or wheat flour which eliminates or retards the growth of yeast, mold and bacteria without adversely affecting the taste of the tortillas.

It is an object of the present invention to provide good tasting, affordable tortillas with an extended shelf life made from corn flour or wheat flour.

It is an object of the present invention to provide corn flour or wheat flour that has been treated with a preservative such that tortillas, and similar foods, produced from the flour will have an extended shelf life without having adverse taste characteristics or prohibitive costs.

It is an object of the present invention to provide a corn-based or a wheat-based dough or raw tortilla that has an extended shelf life without having adverse taste characteristics or prohibitive cost.

It is an object of the present invention to provide a corn-based or a wheat-based dough suitable for baking into tortillas or similar products, such that the tortillas or similar products made from the dough have an extended shelf life without having adverse taste characteristics or prohibitive cost.

It is an object of the present invention to provide a liquid preservative composition that can be used to extend the shelf life of tortillas made from corn flour or wheat flour.

These and other objects will become apparent upon reference to the following specification and claims.

By the present invention, it is proposed to meet these objectives and other more specific objectives which will become apparent as the description proceeds. To this end, a preservative process is provided for extending the shelf life of tortillas, tortilla dough, and similar foodstuffs made from corn flour or wheat flour. The preservative comprises benzoic acid, propionic acid, and phosphoric acid, with the ratio of propionic acid to phosphoric acid by weight being at least 2.5 to 1.

DETAILED DESCRIPTION OF PREFERRED EMBODIMENTS

A preferred embodiment of the present invention is a liquid preservative composition of phosphoric acid, propionic acid, and benzoic acid. The present invention combines propionic acid and phosphoric acid in a taste appealing ratio that acts as an acidifier and as a preservative. In preferred embodiments, additional preservatives are added to control the growth of yeast or bacteria. In the preferred embodiment, the additional preservatives are benzoic acid, sorbic acid methyl and propyl paraben, or their salts. The preferred method of applying the preservative is to mix it with water before adding the water to the dry ingredients to form tortilla dough, but it can be added directly to the dough. The preservative is antimicrobial, and extends the shelf life of tortillas that have been treated with it by inhibiting or eliminating the growth of mold, yeast, and bacteria. While it should be appreciated that the antimicrobial activity of propionic acid, phosphoric acid, and benzoic acid are well known, the present invention is the first time that these components have been combined in a preservative composition to effectively extend the shelf life of corn tortillas or wheat tortillas. In contrast to the prior art, benzoic acid was effective at pH levels near, and even slightly above, a pH of 5. Further, this novel combination surprisingly imparted a fresh taste with a slight sweetness at the finish.

The following method and recipe for manufacturing preserved wheat flour tortillas is preferable to known alternatives. A dry premix is made by mixing wheat flour, shortening, salt, baking powder, and baking soda in a mixer. Water and the liquid preservative composition are added to the dry premix. Preferably, the liquid preservative composition is added directly to a water line which carries the water to the mixer. The preservative composition comprises, by relative weight, 74.2 percent propionic acid, 19.1 percent phosphoric acid, and 6.7 percent benzoic acid. A preferred bulk recipe for wheat tortillas includes 485.85 pounds of the dry premix, 150.2 pounds of water, and 2.7 pounds of the preservative composition. Thus, it can be seen that in this preferred recipe, the liquid preservative composition accounts for approximately 0.42 percent of the overall weight of the tortilla dough. It is common to express the proportion of a preservative as it relates to the weight of the flour; this proportion is known as baker's weight. The baker's weight of the preservative in the preferred embodiment is approximately 0.9 percent. Favorable results have also been obtained using the same amounts of dry premix and water, and liquid preservative composition ranging between 2.4 pounds (0.38 percent of the overall dough weight) and 3.3 pounds (0.47 percent of the overall dough weight).

An alternative embodiment of the liquid preservative composition substitutes methyl and propyl parabens or sorbic acids or their salts for benzoic acid. Use of this alternative liquid preservative composition utilizing methyl and propyl parabens or sorbic acid and its salts is identical to that outlined above. A particular alternative that has been found effective is composed by relative weight percent: 55.5 percent propionic acid, 14.3 percent of 75% phosphoric acid, 0.4 percent methyl paraben, 0.4 percent propyl paraben, and 29.4 percent water.

An important feature of the present invention is that it uses propionic acid in greater proportion than would be needed merely for its antimicrobial effect. In this manner, propionic acid also serves to reduce the pH level of the tortilla dough. This allows use of a lesser amount of phosphoric acid, and consequently, avoids the negative taste characteristics often associated with phosphoric acid. Typical preservatives using both propionic acid and phosphoric acid in conjunction with each other have a ratio of propionic acid to phosphoric acid of approximately 1:1. An improved preservative results from using propionic acid and phosphoric acid in the ratio of 2.5:1. Through experimentation on tortillas it was determined that the ideal ratio of propionic acid to 75% phosphoric acid by weight is 3.88 to 1, or by actual weight of the acids, 5.17:1. An even greater amount of propionic acid may be necessary initially to preserve cooked products if the mixture is added while raw, to compensate for the volatilization of the propionic acid that occurs during high temperature processing.

Manufacturing studies were performed using an experimental preservative preparation containing phosphoric acid and propionic acid in the above noted ratio. Tortilla dough was treated with this experimental preparation at levels of 0.90% and 0.95% of the tortilla flour weight. Tortillas were then manufactured from the treated dough. The experimental preparation was effective in inhibiting mold formation without imparting an off taste. This was an improvement over existing combinations of propionic and phosphoric acid. A fermented odor was detectable on the tenth day after manufacture. New experimental preservatives were then formed with the addition of antimicrobials known to be effective against fermentation. Tortillas made from dough treated with the new experimental preservatives were analyzed for carbon dioxide production to determine which antimicrobial was the most effective in controlling the fermented odor. Benzoic acid was found to have the best qualities for preventing spoilage, cost efficiency, and solubility.

The effectiveness of benzoic acid as an antimicrobial in the tortillas was somewhat unexpected since the optimum pH range is reported to be 2.5 to 4. The pH levels of the treated tortillas were in the range of 4.8 to 5.4. Benzoic acid has been reported to be generally effective as an antimicrobial only in more acidic environments. Also surprising was the resulting taste of the treated tortillas which was fresh with a slight sweetnes at the finish. Upon further testing it was determined that by starting with tortilla flour having a pH of approximately 6.3, tortillas with a room temperature shelf life in excess of twenty-one days could be manufactured that were economical and had a fresh pleasant taste.

A particular formulation for the tortillas that has been found effective is described in this paragraph. A preservative solution is prepared consisting of by weight: 5% benzoic acid, 55% propionic acid, 10.72% phosphoric acid, and 28.78% soft water; resulting in relative proportions of benzoic acid, propionic acid and phosphoric acid of 1:11.1:2.14, respectively. Accordingly, without the water, the resulting relative percentages of the acids are 77.92% propionic acid, 15.06% phosphoric acid, and 7.02% benzoic acid. Approximately equal amounts of water and corn flour are provided. An untreated corn masa flour sold under the brand name MASECA · 0 has been used, though other masa corn flours would be acceptable. An amount of the preservative solution equal to approximately 1.05% of the weight of the flour is added to the water. The water, the preservative solution, and the flour are then mixed together to form tortilla dough, known as masa. The resulting shelf life of the tortillas produced from the treated dough is as long as currently available tortillas made from treated masa flour, but the tortillas do not have negative taste characteristics or prohibitive costs. Tortillas have also been tested using masa flour containing propionate, sorbate and fumaric acid. When used with this treated masa flour, a lesser amount of the preservative solution is required to obtain the desired shelf life.

The shelf life of tortillas made from dough treated with the preservative solution is dependent on the pH of the tortilla flour. The typical pH of the untreated tortilla flour is 6.3, but can range from 6.0 to 6.8. In general, the lower the starting pH of the tortilla flour, the longer the shelf life will be for the resulting tortilla. With a flour of pH 6.3, the resulting pH of the finished tortilla will be approximately 5.01, and a shelf life in excess of twenty days can be expected. If the pH of the flour is 6.8, the resulting pH of the finished tortilla will be approximately 5.32, and the expected shelf life is approximately ten days. By measuring the pH of the tortilla flour before manufacturing, the pull expiration date marked on the packages can be adjusted to correspond with the expected shelf life, or the amount of preservative used can be increased to compensate for the higher pH. The moisture content of these tortillas after cooking is in the range of approximately 46–50%.

The above formulation for the preservative solution has also been found to be effective in extending the shelf life of uncooked tortilla dough. To prepare an extended shelf life tortilla dough composition, a tortilla flour mixture is prepared containing three parts tamale flour and one part taco shell yellow flour. Flours prepared by the AZTECA MILLING COMPANY have been used, but flours manufactured by other companies would benefit equally from the preservative solution. Water in the amount of approximately 125–140% of the weight of the tortilla flour is combined with an amount of the preservative solution equal to between approximately 1.25–2.0% of the weight of the tortilla flour. The water and preservative solution are then blended with the tortilla flour mixture to form the treated tortilla dough composition. Compared with typical untreated tortilla doughs, which can spoil in less than a day, the tortilla dough composition treated with the preservative solution of the present invention has a shelf life of several days, up to in excess of 20 days at room temperature.

The pH of dough made according to the preferred recipe outlined above using approximately 0.55 percent by weight of the dought of the liquid preservative composition is approximately 6.2. After cooking, the tortilla pH was found to be approximately 5.8. These pH levels compare to pHs of approximately 5.9 and 6.0 respectively for the dough and resulting tortillas made with a conventional dry preservative mixture of calcium propionate, fumaric acid, and sorbic acid. The elevated pH level of the dough and tortillas made with the liquid preservative composition of the present invention is advantageous because low pH can cause machinability problems with the dough and may result in tortillas with a translucent appearance. The moisture content of the dough and resulting tortillas is also increased over that of tortillas made with conventional dry preservatives. If desired, this increase can be eliminated by decreasing the amount of water used in making the dought by the amount of liquid preservative added.

Using the preferred recipe outlined above with the liquid preservative composition accounting for approximately 0.42 percent of the overall tortilla dough by weight, a shelf life for tortillas of approximately fourteen days may be achieved, without the negative taste associated with dry preservative mixtures. By increasing the amount of liquid preservative composition used to approximately 0.52 percent of the overall tortilla dough by weight, the shelf life of tortillas may be extended beyond twenty days.

Use of a liquid has several advantages: material costs are cheaper; better availability of automated equipment to dose the liquid rather than requiring manual labor to weigh out the dry ingredients; easier flexibility in changing the mold inhibitor levels to compensate for seasonal variations in microbial stress; disperse better in the mixture because there is no need for it to dissolve; and exposure to mold inhibitor dust that results from dry mold inhibitors is eliminated. By diluting the preservative composition with water before adding it to the dry ingredients, an unfavorable reaction with the wheat flour, known as "burning," can be avoided.

In addition to this particular formulation, which has been found to be effective, it is believed that beneficial results can be obtained using propionic acid, phosphoric acid, and benzoic in conjunction with each other in differing proportions. Specifically, novel and effective preservatives should be formed using solutions containing relative percentages of the acids of from 50–98% propionic acid, from 1–30% phosphoric acid, and from 1–20% of a yeast or bacteria inhibiting substance such as benzoic acid, benzoate, parabens, sorbic acid, or sorbate. Benzoic acid is found to be especially well-suited for use with propionic acid and phosphoric acid. Depending on the exact formulation of the preservative solution, and its use, the solution should be a useful preservative in doses at least as small as 0.2% of the weight of the flour in the tortilla dough.

Therefore, it can be seen that the combination of benzoic acid with propionic acid and phosphoric acid, in the proportions specified, is an effective preservative for products made from tortilla flour. This combination improves the shelf live of both cooked products and raw dough made from corn flour or wheat flour, especially when combined with a liquid yeast or bacteria inhibitor such as benzoic acid. It is affordable and has improved taste characteristics compared to currently available dry preservative alternatives. It also has several advantages in the production of tortillas.

The foregoing description merely explains and illustrates preferred embodiments of the invention and the invention is not limited thereto, except insofar as the claims are so limited. Those skilled in the art, who have the disclosure before them, will be able to make modifications and variations therein without departing from the scope of the invention. For example, products similar to tortillas, but with a slightly different form, or with different ingredients should benefit equally from the invention and are intended to fall within the scope of the claims.

What is claimed is:

1. A method for simultaneously extending the shelf life of and producing a nonacidic taste in masa dough comprising:
    adding propionic acid, phosphoric acid, and benzoic acid to the masa dough
    wherein the acids are added in amounts which result in an extended shelf life and a nonacidic taste in the finished product, and
    wherein the propionic acid and the phosphoric acid are added in a ratio of at least two and one half parts propionic acid to each part phosphoric acid, by weight.

2. A method of claim 1 wherein
    a. the amount of propionic acid and phosphoric acid are in a combination sufficient to reduce pH of the dough to between about 4.7 and about 5.4, and inhibit formation of mold, said combination of propionic acid and phosphoric acid being in a ratio of approximately 5.17 parts propionic acid to each part phosphoric acid by weight, and
    b. the amount of benzoic acid is a sufficient amount of benzoic acid to extend the shelf life to a period of not less than 5 days, said amount of benzoic acid being in an approximate ratio of 11.1 parts propionic acid to each part benzoic acid by weight.

3. A method for simultaneously extending the shelf life of and producing a nonacidic taste in tortilla dough comprising:
    adding propionic acid, phosphoric acid, and benzoic acid to the tortilla dough
    wherein the acids are added in amounts which result in an extended shelf life and a nonacidic taste in the finished product, and
    wherein the propionic acid and phosphoric acid are added in a ratio of at least two and one half parts propionic acid to each part phosphoric acid, by weight.

4. The method of claim 3 wherein
    a. the amount of propionic acid and phosphoric acid are in a combination sufficient to reduce pH of the tortilla dough to between about 4.7 and about 5.4, and inhibit formation of mold, said combination of propionic acid and phosphoric acid being in a ratio of approximately 5.17 parts propionic acid to each part phosphoric acid by weight, and
    b. the amount of benzoic acid is a sufficient amount of benzoic acid to extend the shelf life to a period of not less than 5 days, said amount of benzoic acid being in an approximate ratio of 11.1 parts propionic acid to each part benzoic acid by weight.

5. A method for simultaneously extending the shelf life of and producing a nonacidic taste in tortillas comprising:
    adding propionic acid, phosphoric acid, and benzoic acid to the tortilla dough
    wherein the acids are added in amounts which result in an extended shelf life and a nonacidic taste in the finished product, and
    wherein the propionic acid and phosphoric acid are added in a ratio of at least two and one half parts propionic acid to each part phosphoric acid, by weight;
    forming the tortilla dough into tortillas; and cooking the tortillas.

6. The method of claim 5 wherein
   a. the amount of propionic acid and phosphoric acid are in a combination sufficient to reduce pH of the tortilla dough to between about 4.7 and about 5.4, and inhibit formation of mold, said combination of propionic acid and phosphoric acid being in a ratio of approximately 5.17 parts propionic acid to each part phosphoric acid by weight, and
   b. the amount of benzoic acid is a sufficient amount of benzoic acid to extend the shelf life to a period of not less than 5 days, said amount of benzoic acid being in an approximate ratio of 11.1 parts propionic acid to each part benzoic acid by weight.

7. A method for simultaneously extending the shelf life of and producing a nonacidic taste in tortilla flour comprising:
   adding propionic acid, phosphoric acid, and benzoic acid to the tortilla flour
   wherein the acids are added in amounts which result in an extended shelf life and a nonacidic taste in the finished product, and
   wherein the propionic acid and phosphoric acid are added in a ratio of at least two and one half parts propionic acid to each part phosphoric acid, by weight.

8. The method of claim 7 wherein
   a. the amount of propionic acid and phosphoric acid are in a combination sufficient to reduce pH of a tortilla dough, made from the tortilla flour and water, to between about 4.7 and about 5.4, and inhibit formation of mold, said combination of propionic acid and phosphoric acid being in a ratio of approximately 5.17 parts propionic acid to each part phosphoric acid by weight, and
   b. the amount of benzoic acid is a sufficient amount of benzoic acid to extend the shelf life to a period of not less than 5 days, said amount of benzoic acid being in an approximate ratio of 11.1 parts propionic acid to each part benzoic acid by weight.

* * * * *

UNITED STATES PATENT AND TRADEMARK OFFICE
CERTIFICATE OF CORRECTION

PATENT NO. : 6,355,289 B1
DATED : March 12, 2002
INVENTOR(S) : Ann Marie Rolow and Francisco Arroyo It is certified that error appears in the above-identified patent and that said Letters Patent is hereby corrected as shown below:

<u>Title page,</u>
Item [73], should read as follows:
-- [73] Assignees: Desarrollo Industrial y Technologico S.A. Guadalupe Neuvo Leon (MX), and Kemin Industries, Inc. Des Moines, IA (US) --

Signed and Sealed this

Third Day of December, 2002

JAMES E. ROGAN
*Director of the United States Patent and Trademark Office*